US009157745B2

(12) United States Patent
Das et al.

(10) Patent No.: US 9,157,745 B2
(45) Date of Patent: Oct. 13, 2015

(54) SCALABLE ROUTING FOR MOBILE STATION NAVIGATION WITH LOCATION CONTEXT IDENTIFIER

(75) Inventors: Saumitra Mohan Das, San Jose, CA (US); Behrooz Khorashadi, San Jose, CA (US); Edward Thomas Lingham Hardie, Menlo Park, CA (US)

(73) Assignee: QUALCOMM Incorporated, San Deigo, CA (US)

( * ) Notice: Subject to any disclaimer, the term of this patent is extended or adjusted under 35 U.S.C. 154(b) by 633 days.

(21) Appl. No.: 12/987,922

(22) Filed: Jan. 10, 2011

(65) Prior Publication Data

US 2011/0172906 A1    Jul. 14, 2011

Related U.S. Application Data

(60) Provisional application No. 61/295,089, filed on Jan. 14, 2010, provisional application No. 61/295,149, filed on Jan. 14, 2010.

(51) Int. Cl.
*G01C 21/20* (2006.01)
*G01C 21/32* (2006.01)
(Continued)

(52) U.S. Cl.
CPC .............. *G01C 21/20* (2013.01); *G01C 21/206* (2013.01); *G01C 21/34* (2013.01); *G01C 21/36* (2013.01); *G01C 21/3644* (2013.01); *G01C 21/3682* (2013.01)

(58) Field of Classification Search
CPC .. G01C 21/20; G01C 21/206; G01C 21/3638; G01C 21/32; G01C 21/165; G01C 21/16; G01C 21/3617; G01C 21/3685; G01S 5/0236; G01S 5/0242; G01S 5/02; G01S 5/021; G08G 1/0962; G08G 1/14; H04W 4/02; H04L 63/104
USPC ............ 701/414, 424, 457, 500, 533, 436, 1, 701/431; 455/404.2, 456.3
See application file for complete search history.

(56) References Cited

U.S. PATENT DOCUMENTS

| 7,403,762 B2 * | 7/2008 | Morgan et al. ............. 455/404.2 |
| 7,899,583 B2 * | 3/2011 | Mendelson ....................... 701/1 |
| 8,041,335 B2 * | 10/2011 | Khetawat et al. .......... 455/404.2 |

(Continued)

FOREIGN PATENT DOCUMENTS

| CN | 101405572 A | 4/2009 |
| CN | 101556158 A | 10/2009 |

(Continued)

OTHER PUBLICATIONS

International Search Report and Written Opinion—PCT/US2011/021414—ISA/EPO—Apr. 27, 2011.

(Continued)

*Primary Examiner* — Tuan C. To
*Assistant Examiner* — Yuri Kan
(74) *Attorney, Agent, or Firm* — Arnold J. Gum

(57) ABSTRACT

Examples disclosed herein may relate to identifying up to a specified amount of points of interest nearest to an estimated position of a mobile station on a first map, selecting a second map identified by a first location context identifier associated with a first point of interest of the identified points of interest, and determining a route from the estimated position of the mobile station to a destination point using the first map and the second map.

70 Claims, 14 Drawing Sheets

(51) Int. Cl.
*G01C 21/34* (2006.01)
*G01C 21/36* (2006.01)

(56) References Cited

U.S. PATENT DOCUMENTS

| | | |
|---|---|---|
| 2004/0193369 A1* | 9/2004 | Kokojima et al. ............ 701/209 |
| 2006/0058945 A1* | 3/2006 | Watanabe ..................... 701/200 |
| 2007/0150186 A1* | 6/2007 | Ingulsrud ...................... 701/211 |
| 2007/0219708 A1* | 9/2007 | Brasche et al. ............... 701/207 |
| 2008/0077326 A1* | 3/2008 | Funk et al. .................... 701/220 |
| 2008/0176583 A1* | 7/2008 | Brachet et al. ............. 455/456.3 |
| 2009/0216438 A1* | 8/2009 | Shafer ........................... 701/210 |
| 2009/0325606 A1* | 12/2009 | Farris .......................... 455/456.3 |
| 2011/0172906 A1* | 7/2011 | Das et al. ...................... 701/201 |

FOREIGN PATENT DOCUMENTS

| | | |
|---|---|---|
| CN | 101755247 A | 6/2010 |
| JP | H04363087 A | 12/1992 |
| JP | 10170301 A | 6/1998 |
| JP | 2009025974 A | 2/2009 |
| TW | 1359942 B | 3/2012 |

OTHER PUBLICATIONS

Taiwan Search Report—TW100101483—TIPO—Aug. 30, 2013.

* cited by examiner

SCALABLE ROUTING FOR MOBILE STATION NAVIGATION WITH LOCATION CONTEXT IDENTIFIER

CLAIM OF PRIORITY UNDER 35 U.S.C. §119

This application claims priority under 35 USC 119 to U.S. Provisional Application Ser. No. 61/295,089, filed Jan. 14, 2010, and entitled "Seamless Pedestrian Navigation Through Multi-Floor, Indoor and Outdoor Contexts" and to U.S. Provisional Application Ser. No. 61/295,149, filed Jan. 14, 2010, and entitled "Scalable Routing on Static Points of Interest (POIs)," which are assigned to the assignee hereof and which are incorporated herein by reference.

BACKGROUND

1. Field

Subject matter disclosed herein relates to mobile station navigation with scalable routing using a location context identifier.

2. Information

A position of a mobile station, such as a cellular telephone, may be estimated based on information gathered from various systems. One such system may comprise a wireless local access network (WLAN) communication system comprising a number of access points to support communications for a number of mobile stations. A satellite positioning system (SPS) may also be utilized to estimate a position of a mobile station. A navigation solution for a mobile station may be based at least in part on a current estimated position of a mobile station and may include routing a path from a current estimated position to a destination point. A routing solution may be displayed on a graphical user interface, for example, on a mobile station to aid a pedestrian or motorist in traversing a path to a destination point. Difficulties may arise, however, if a route from a current estimated position to a destination point includes indoor portions and outdoor portions, for example, or if a route includes multiple floors in an indoor portion, for another example.

BRIEF DESCRIPTION OF THE FIGURES

Non-limiting and non-exhaustive examples will be described with reference to the following figures, wherein like reference numerals refer to like parts throughout the various figures.

SUMMARY

Figure 1:
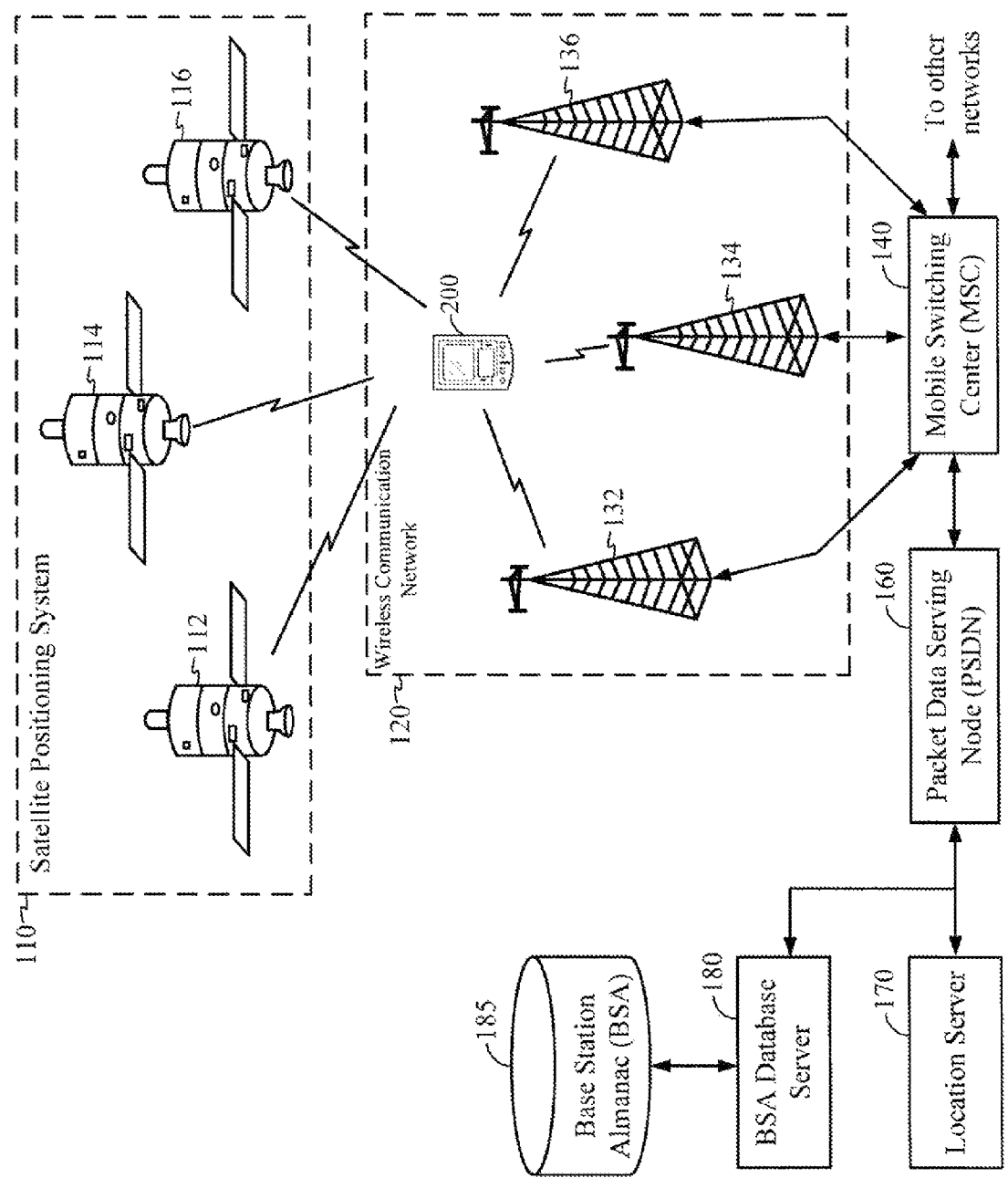
FIG. 1 is a schematic block diagram depicting an example mobile station in communication with an example wireless communication network and an example satellite positioning system.

In an example implementation, a method may comprise estimating a position of a mobile station, identifying up to a specified amount of points of interest nearest to the estimated position of the mobile station on a first map, selecting a second map identified by a first location context identifier associated with a first point of interest of the identified points of interest, and determining a route from the estimated position of the mobile station to a destination point using the first map and the second map. In another example implementation, an article may comprise a storage medium having stored thereon instructions executable by a processor of a mobile station to estimate a position of the mobile station, identify up to a specified amount of points of interest nearest to the estimated position of the mobile station on a first map, select a second map identified by a first location context identifier associated with a first point of interest of the identified points of interest, and determine a route from the estimated position of the mobile station to a destination point using the first map and the second map. In a further example implementation, a mobile station may comprise a memory to store a plurality of maps for navigation operations, and a processor to identify up to a specified amount of points of interest nearest to an estimated position of a mobile station corresponds to a point of interest on a first map of the plurality of maps, select a second map of the plurality of maps identified by a first location context identifier associated with a first point of interest of the identified points of interest, and determine a route from the estimated position of the mobile station to a destination point using the first map and the second map. In an additional example implementation, an apparatus may comprise means for estimating a position of a mobile station, means for identifying up to a specified amount of points of interest nearest to the estimated position of the mobile station on a first map, means for selecting a second map identified by a first location context identifier associated with a first point of interest of the identified points of interest, and means for determining a route from the estimated position of the mobile station to a destination point using the first map and the second map.

DETAILED DESCRIPTION

As discussed above, a position of a mobile station, such as a cellular telephone, for example, may be estimated based on information gathered from various systems. One such system may comprise a wireless local access network (WLAN) communication system comprising a number of access points to support communications for a number of mobile stations. A satellite positioning system (SPS) may also be utilized to estimate a position of a mobile station. A navigation solution for a mobile station may be based at least in part on a current estimated position of a mobile station and may include routing a path from a current estimated position to a destination point. A routing solution may be displayed on a graphical user interface, for example, on a mobile station to aid a pedestrian or motorist in traversing a path to a destination point. Difficulties may arise, however, if a route from a current estimated position to a destination point includes indoor portions and outdoor portions, for example. Additionally, difficulties may arise, for example, if an indoor portion includes multiple floors.

End-to-end navigation solutions that may traverse a route from a current position of a mobile station to destination point may require an integration of outdoor navigation techniques and indoor navigation techniques. Indoor routing and outdoor routing techniques may differ in map scale, routing algorithms, or location identification technology, for example. In an aspect, for an example navigation technique, a user need not be aware of one or more maps that may be utilized for navigation operations, and a user may need not take action in the event of a change in maps, for example in a change of maps as a user moves from an outdoor area to an indoor area, or as a user moves from floor to floor in an indoor area.

In an aspect, a transition from one navigation map to another may be accomplished through the use of a system utilizing maps marked with one or more positions of interest (POI) that may individually comprise one or more location context identifiers (LCI). One or more maps within an example navigation system may be associated with an LCI. In an aspect, a map may be uniquely identified by an LCI. Additionally, a floor of a building may be composed of multiple maps individually identified by respective LCIs. In an example implementation, a floor of a building may be entirely identified by an LCI. Further, in another aspect, a POI may include a reference to multiple LCIs that may be reachable from the POI. In a further aspect, an LCI may be generated using a universal unique identifier (UUID) hashing algorithm, or the like. In this manner, a POI annotation on a first map may provide one or more references to one or more other associated maps. In an aspect, one or more maps may be referenced in another map by using one or more POI that contain embedded LCI information. During a navigation operation, if a user reaches one of the points of interest that include embedded LCI information, the embedded information may be utilized to retrieve a subsequent map, and route determinations may continue using the subsequent map. As used herein, the term "point of interest" relates to any point on a map that may identify a transition from one area to another area. Example POIs may include staircases, elevators, escalators, moving walkways, external doors, internal doors separating two indoor portions of a building or a connection between two buildings. However, these are merely example POIs, and the scope of claimed subject matter is not limited in this respect. Further, as used herein, the term "location context identifier" relates to any information associated with a position of interest that identifies one or more maps that may be used in navigation operations for a mobile station.

In an aspect, a position of a mobile station may be estimated. A determination may be made as to which of one or more POIs on a first map are nearest to the estimated position of the mobile station. A POI on the first map may have embedded therein an LCI identifying a second map associated with the point of interest. The second map may be selected for use by the mobile station in a navigation operation to determine a route from the estimated position of the mobile station to a specified destination. Additional maps may be selected as needed in order to complete a route determination, in an aspect. Also, in a further aspect, routing techniques may be iterative. Multiple maps may be retrieved using LCIs embedded in one or more POIs. For example, if a user desires to travel from one building to another, a map for the first building may be retrieved, a map for an outdoor area leading to the second building may be retrieved, and a second map for the second building may be also retrieved. Various possible routes may be analyzed to determine a shortest route, for example.

For an example, a first map may be used by a mobile station to perform navigation operations. In an example, the first map may comprise a map of an outdoor area. In an aspect, a user may carry a mobile station to an entrance of a building. Also in an aspect, a location of the entrance of the building may comprise a point of interest according to information stored as part of the first map. As a result of a detection that the mobile station has reached the point of interest, which, for this example, corresponds to a location of an entrance to a building, a second map identified by a location context identifier associated with the point of interest may be retrieved, and the mobile station may perform navigation operations using the retrieved second map. For the present example, the second map may comprise a map of at least a portion of an indoor space within the building. In this manner, a user may carry a mobile station to an entrance to a building, having been guided to the entrance by a navigation solution provided by the mobile station, and without the user taking any particular action, the mobile station may automatically retrieve a map of the interior of the building and, as the user enters the building, the mobile station may continue to provide navigation solutions. Thus, a seamless transition may be experienced by the user in crossing from one area to another, which for this example includes moving from an outdoor area to an indoor area. Of course, these are merely example navigation operations, and claimed subject matter is not limited in scope in these respects.

In an aspect, estimates may be made for positions at various points in time of a mobile station. For example, trilateration, triangulation, or multilateration operations may be utilized using signals received from various access points or other wireless transmitters, as described more fully below, to determine an estimate for the position of the mobile station. Additional techniques for determining an initial estimate of a position of a mobile station may include, for example, utilizing a previously determined location estimate based on one or more satellite positioning system (SPS) signals to approximate an initial estimate. Sensors in a mobile station such as, for example, accelerometers or gyroscopes, may be utilized to determine an estimate of a position of the mobile station based on a previously estimated location, for another example. It should be noted that claimed subject matter is not limited to any particular technique for determining an estimate of a position of a mobile station.

FIG. 1 is a schematic block diagram of an SPS 110 and a wireless communication network 120 in communication with a mobile station 200. Wireless communication network 120, for this example, may comprise a cellular communication network capable of enabling voice communication for a number of mobile stations including mobile station 200, for example, and may further support position estimation for the mobile stations in addition to providing voice communication. Wireless communication network 120 may comprise any of a number of network types, several examples of which are described below. Wireless communication network 120 for this example comprises wireless transmitters 132, 134, and 136 that provide communication for a number of wireless terminals such as, for example, mobile station 200. For simplicity, only a few wireless transmitters 132, 134, and 136 are depicted and one mobile station 200 is depicted in FIG. 1. Of course, other examples may include additional numbers of wireless transmitters, and the configuration of the wireless transmitters depicted in FIG. 1 is merely an example configuration. Also, wireless communication network 120 is merely an example wireless communications system, and the scope of claimed subject matter is not limited in this respect.

As used herein, the term "wireless transmitter" is meant to include any wireless communication station or device used to facilitate communication in a wireless communications system, such as, for example, a cellular network, although the scope of claimed subject matter is not limited in this respect. An example type of wireless transmitter utilized in a cellular network may be referred to as a base station. In another aspect, a wireless transmitter may comprise a femtocell, utilized to extend cellular telephone service into a business or home. In such an implementation, one or more mobile stations may communicate with a femtocell via a code division multiple access (CDMA) cellular communication protocol, for example, and the femtocell may provide the mobile station access to a larger cellular telecommunication network by way of another broadband network such as the Internet. In another aspect, wireless transmitters may be included in any of a range of electronic device types. In an aspect, a wireless transmitter may comprise a wireless local area network (WLAN) access point, for example. Such a WLAN may comprise a network that is compatible with one or more of the IEEE 802.11x standards, in an aspect, although the scope of claimed subject matter is not limited in this respect. Additionally, the use of the term "transmitter" in describing a device does not limit that device's function to, transmitting only. For example, base stations and access points are typically capable of both transmitting and receiving wireless signals.

As used herein, the term "mobile station" (MS) refers to a device that may from time to time have a position that changes. Such changes in position may comprise changes to direction, distance, orientation, etc., as a few examples. In particular examples, a mobile station may comprise a cellular telephone, wireless communication device, user equipment, laptop computer, other personal communication system (PCS) device, personal digital assistant (PDA), personal audio device (PAD), portable navigational device, or other portable communication devices. A mobile station may also comprise a processor or computing platform adapted to perform functions controlled by machine-readable instructions.

In an aspect, SPS 110 may comprise a number of space vehicles (SV), for example SVs 112, 114, and 116. For an example, SPS 110 may comprise one or more satellite positioning systems, such as GPS, GLONASS and Galileo, although the scope of claimed subject matter is not limited in this respect. In one or more aspects, mobile station 200 may receive signals from SVs 112, 114, and 116, and may communicate with one or more of wireless transmitters 132, 134, and 136. For example, mobile station 200 may obtain one or more measurements from one or more signals received from one or more of the SVs or wireless transmitters. However, in some circumstances timing signals from an SPS may not be available. In such a circumstance, mobile station 150 may gather propagation delay information through communication with one or more of wireless transmitters 132, 134, or 136. Mobile station 150 may calculate a position for the mobile station based, at least in part, on timing calibration parameters received through communication with one or more of wireless transmitters 132, 134, or 136, and further based, at least in part, on known locations of the wireless transmitters. Mobile station 200 may also make use of an estimated propagation delay for signals received from a wireless transmitter source, a satellite source, or both, to measure ranges to such sources.

In another aspect, position determination calculations may be performed by a network entity such as, for example, location server 170 depicted in FIG. 1, rather than at mobile station 200. Such a calculation may be based, at least in part, on information gathered by mobile station 200 from one or more of wireless transmitters 132, 134, or 136. In a further aspect, location server 170 may transmit the calculated position to mobile station 200.

A mobile switching center (MSC) 140 for this example may be coupled to wireless transmitters 132, 134, and 136, and may further couple to other systems and networks, such as a public switched telephone network (PSTN), a packet data serving node (PDSN) 160, and so on. Location server 170 may collect and format location data, provide assistance to mobile stations for position estimation, or perform computations to obtain position estimates for the mobile stations. BSA server 180 manages a BSA database 185, which for this example stores a base station almanac for wireless communication network 120.

Also in an aspect, location server 170 may provide one or more maps to mobile station 200. Maps provided to mobile station 200 may depend, at least in part, on one or more location context identifiers (LCI) associated with respective one or more points of interest on one or more maps. An LCI may uniquely identify a map, and a POI contained in a map may include references to one or more LCIs that the POI may reach. For example, a door of a building may comprise a POI, and that particular POI may include information relating to an LCI identifying a map for an outdoor area on the outdoor side of the door and may also include information relating to an LCI identifying a map of an indoor are on the other indoor side of the door. Maps provided to mobile station 200 may be utilized by mobile station 200 to determine navigation solutions for a user. A map may be presented in a visual manner to a user by way of a graphical user interface or display screen on mobile station 200. As used herein, the term "map" relates to any information that may describe indoor or outdoor areas such that navigation solutions may be determined between a starting point and a destination point. In an aspect, maps may include metadata that may allow for route computation. For example, a graph representation of a map may allow for route computation. Example graph representations of various example maps are described below. As previously mentioned, a map may comprise information that may be displayed on a mobile station or other computing platform. A map may further comprise one or more points of interest. A point of interest may be associated with a set of coordinates, for example a set of SPS coordinates. A point of interest may further be associated with one or more location context identifiers. As previously mentioned, an LCI may comprise an identity of another map. In an aspect, an LCI may comprise a pointer to a map, although the scope of claimed subject matter is not limited in this respect.

Figure 2:
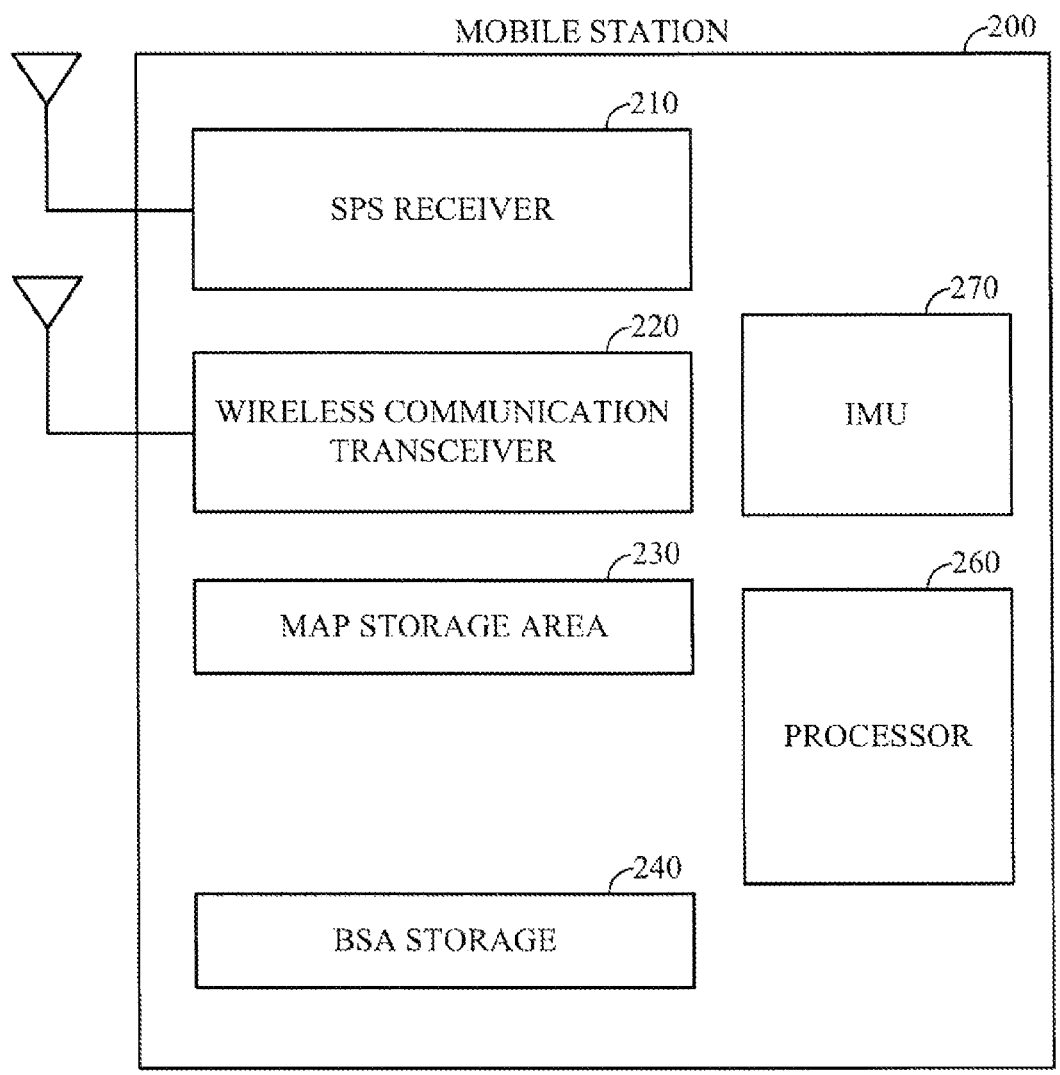
FIG. 2 is a schematic block diagram of an example embodiment of a mobile station.

FIG. 2 is a schematic block diagram of an example implementation of mobile station 200. In an aspect, mobile station 200 comprises an SPS receiver 210 and a wireless communication transceiver 220. Thus, mobile station 200 may communicate with one or more SPSs such as SPS 110 and one or more terrestrial wireless networks, such as wireless communication network 120, which may comprise a cellular network in an aspect, or may comprise a WLAN, in another aspect, for example. In another aspect, mobile station 200 may further comprise a memory device that is partitioned, in one example, to store map information in a map storage area 230 and to store base station almanac information in a base station almanac storage area 240.

In a further aspect, mobile station 200 may comprise one or more sensors that for this example are incorporated into Inertial Measurement Unit (IMU) 270 that may be utilized in dead-reckoning navigation operations, for example. Example sensors that may be incorporated in to IMU 270 may include an accelerometer or a gyroscope. However, claimed subject matter is not limited in this respect. Mobile station 200 further comprises processor 260, for this example. Of course, this is merely one example of a configuration of a mobile station, and the scope of claimed subject matter is not limited in this respect.

In an aspect, location information for a plurality of wireless transmitters may be stored in a network entity such as BSA server 180 in wireless communication network 120, or may be stored in any of a wide range of other resources in the wireless network. Further, for an example, location information for wireless transmitters may comprise longitude and latitude, and may for another example also comprise altitude information. However, these are merely examples of location information for wireless transmitters, and the scope of claimed subject matter is not limited in this respect. In another aspect, some wireless transmitters may broadcast their locations, and such location information may be stored in one or more databases of mobile station 200.

Further, in an additional aspect, map storage area 230 may have stored therein a subset of a larger map database, perhaps stored at location server 170, for example. In an aspect, a network entity such as location server 170 may determine which of a plurality of maps are likely to be requested by mobile station 200 to support future navigation operations, and one or more of such maps may be provided to mobile station 200. In a further aspect, location server 170 may provide a map to mobile station 200 at least in part in response to receiving a request from mobile station 200 wherein the request comprises a location context identifier identifying a particular map. Of course, claimed subject matter is not limited in scope in these respects. Also, route determinations may be performed by a network entity such as location server 170, for example. In an aspect, mobile station 200 may transmit a route request to location server 170 at least in part in response to mobile station 200 reaching a transition POI. A "transition POI" may comprise a POI with information related to an LCI, and location server 170 may return a routing solution to mobile station 200. Again, the scope of claimed subject matter is not limited in these respects.

Figure 3:
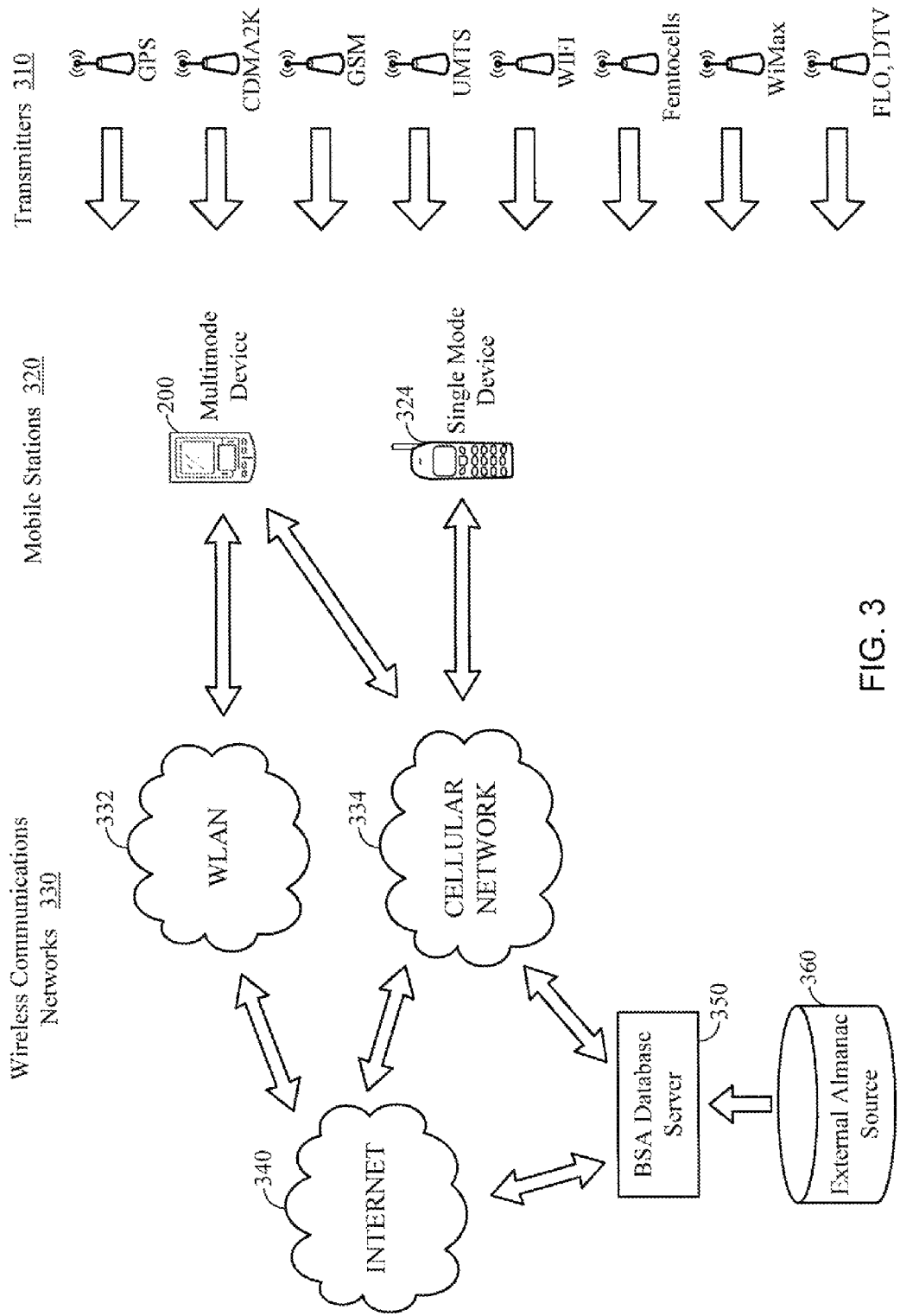
FIG. 3 is an illustration depicting an example almanac server in communication with a number of mobile stations via one or more wireless communication networks.

FIG. 3 is an illustration depicting an example base station almanac (BSA) server 350 in communication with a number of mobile stations 200 and 324 via one or more wireless communication networks 332 and cellular networks 334, and via Internet 340. For this example, mobile station 200 represents a multi-mode device that may support communication with both a packet-switched wireless local area network (WLAN) 332 and a cellular network 334. Of course, these are merely examples of the types of wireless communications networks with which a multimode device may communicate, and the scope of claimed subject matter is not limited in this respect. Also for this example, mobile station 324 represents a single-mode device that may support communication with cellular network 334. Again, the cellular network is merely one example of a wireless communication network with which a mobile station may establish communication.

FIG. 3 further depicts a number of transmitter types 310 that mobile stations 200 and 324 may monitor. Mobile stations 200 and 324 may or may not be subscribed to any given network associated with the various respective transmitter types to be able to monitor signals transmitted from the various transmitter types. Therefore, BSA information provided to the mobile stations may or may not include information associated with networks to which the mobile stations are not subscribed. Mobile stations may specify particular networks or particular transmitter types if making requests for BSA information. For the example of FIG. 3, mobile stations 322 and 324 may request BSA information comprising at least a subset of a BSA database from BSA server 350.

In another aspect, BSA server 350 may obtain a BSA database from an external BSA source 360. For example, a cellular network provider may contract with a third party to develop or provide BSA information to BSA server 350. Additionally, in an aspect, BSA server 350 may store one or more maps to be used by one or more mobile stations for navigation operations, and in another aspect such maps may be provided by an external source. At least a subset of the BSA or map information may eventually be transmitted to mobile stations 200 or 324. Although the example of FIG. 3 depicts two mobile stations, in practice a wide variety of mobile station types, exhibiting a wide range of different functionalities or storage capabilities may be utilized to communicate with a large variety of potential network types. Further, the mobile stations may exhibit a wide range of different usage patterns. Therefore, it may be advantageous for BSA server 350 or another network entity to provide individualized subsets of map or BSA information that the individual mobile stations may require or request, and it may be further advantageous to provide such information formatted in a flexible manner according to a specified file size, coverage area, or transmitter type, to name but a few examples of parameters that may be specified. In one aspect, these parameters may be specified by the mobile stations.

Figure 4:
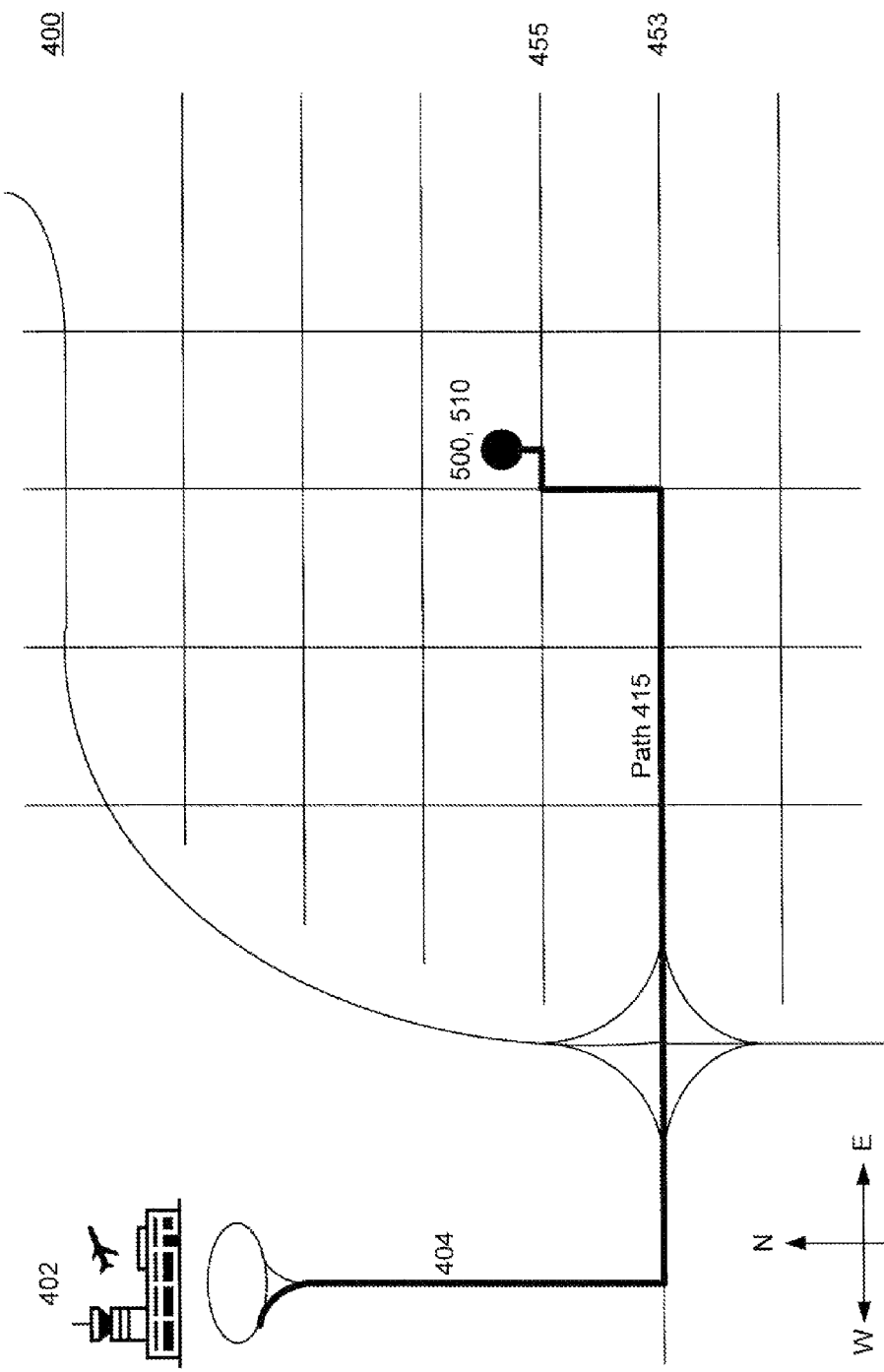
FIG. 4 is a diagram illustrating an example map of an outdoor area including an example navigation path.

FIG. 4 is an illustration of a map 400 depicting an example outdoor area. For an example, the outdoor area depicted in FIG. 4 represents a particular context for navigation operations that may be performed by a mobile station, such as mobile station 200 described above. For the example of FIG. 4, it may be assumed that a user of mobile station 200 arrives at airport 402. In response to a determination that mobile station 200 is estimated to be located at airport 402, map 400 associated with the outdoor area depicted in FIG. 4 may be transmitted to mobile station 200. Alternatively, if map 400 associated with the outdoor area depicted in FIG. 4 is already present at mobile station 200, mobile station 200 may select map 400 for navigation operations and may retrieve map 400 from map storage area 230. Utilizing map 400, mobile station 200 may determine a route from airport 402 to a point of interest 510, which, for an example, may represent an entrance to an office building 500. For the present example, it may be assumed that the user of mobile station 200 is traveling on business, and has planned to visit an individual located in the office building located at point of interest 510. The user may initiate a navigation operation on mobile station 200, and in response to the initiation of the navigation operation, mobile station 200 may determine a route from airport 402 to POI 510. For the present example, the determined route may be represented by a path 415, whereby the user may be directed to travel south along a street 404, to travel east along a street 453, to travel north along street 468, to travel east along street 455, and to proceed to the entrance to the office building located at POI 510. Of course, this is merely an example route and an example map, and claimed subject matter is not limited in scope in these respects.

Figure 5:
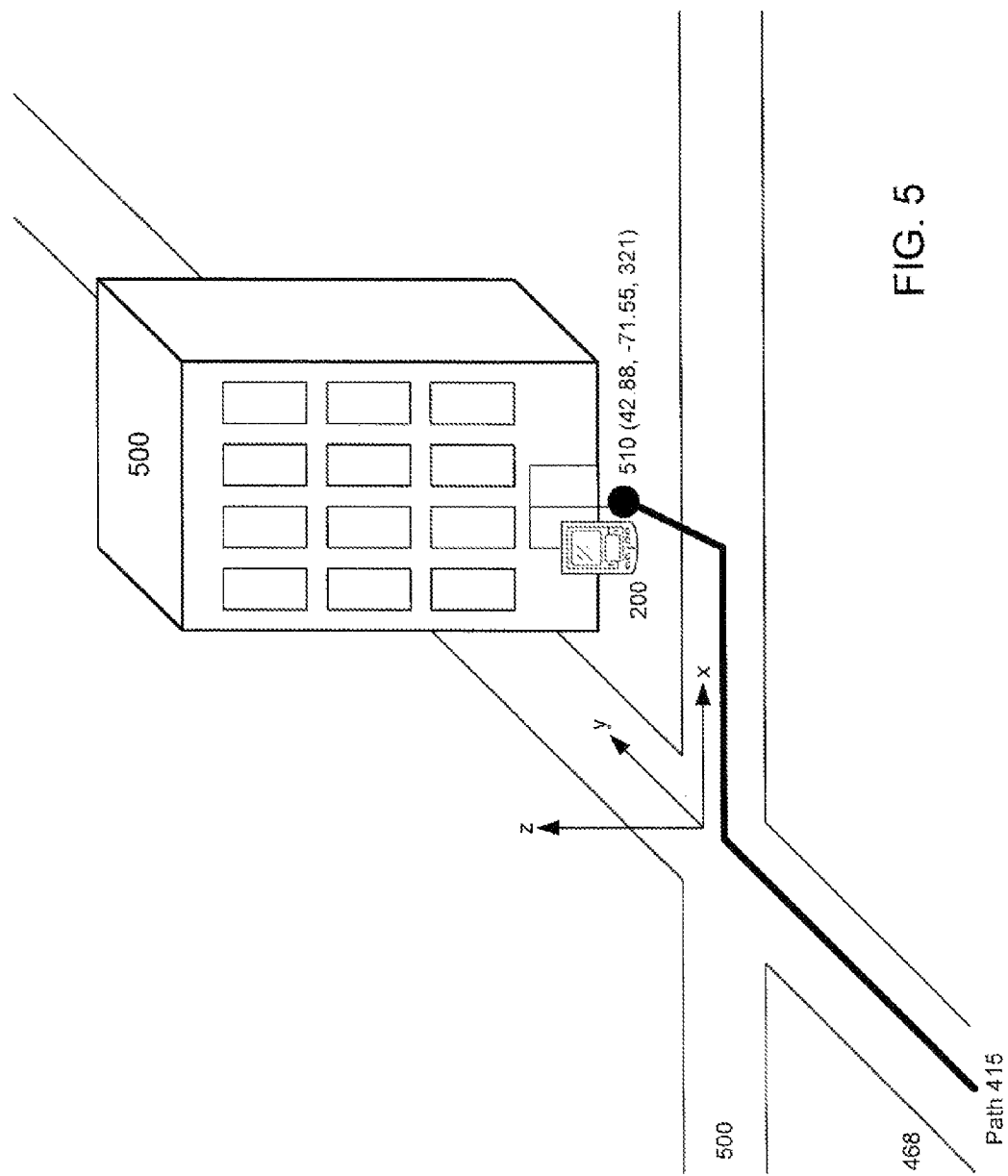
FIG. 5 is a diagram illustrating an example navigation path and a point of interest at a transition between an outdoor area and an indoor area.

FIG. 5 is an illustration depicting a zoomed-in portion of map 400 depicted in FIG. 4. More particularly, FIG. 5 depicts a portion of map 400 in an area in the vicinity of office building 500 near an intersection of street 455 and street 468. Path 415 is depicted leading to POI 510, which, for an example, may be located at SPS coordinates (42.88, −71.55, 321). Of course, these are merely example coordinates, and the scope of claimed subject matter is not limited in this respect. For an example, the user may carry mobile station 200 to the entrance of office building 500, which, for the present example, represents POI 510. As mobile station 200 moves over time, a number of position fixes may be performed, perhaps on a periodic basis, in an aspect. In a further aspect, mobile station 200 may periodically determine its location based at least in part on one or more SPS signals, or on one or more Wi-Fi signals, for example. Additionally, in an aspect, mobile station 200 may perform dead-reckoning navigation operations utilizing one or more IMU sensors 279 in mobile station 200 to continually or periodically update its estimated position based on a previous navigation solution determined at least in part based on one or more SPS or Wi-Fi signals, in an aspect.

At least in part in response to a determination that mobile station 200 has arrived at POI 510, mobile station 200 may select a map identified by a location context identifier (LCI) associated with POI 510. The LCI associated with POI 510, in an aspect, may comprise a pointer to an additional map, or may otherwise identify the additional map. For the present example, a map identified by the LCI associated with POI 510 may include information related to an indoor area within office building 500. In this manner, as the user enters office building 500, a context switch may occur within mobile station 200 whereby a new map is made available for navigation functions without requiring any intervention by the user.

Examples in FIGS. 4 and 5 depict a situation where a mobile station is being carried from an outdoor area into an indoor area. However, claimed subject matter is not limited in this respect, and map changes, including selecting one or more maps in response to a determination that mobile station 200 has arrived at a POI comprising an LCI that identifies a map, may occur between two different outdoor area maps, two different indoor area maps, an indoor area map to an outdoor area map, or an outdoor area map to an indoor area map. Additionally, claimed subject matter is not limited to any particular type of map, that may be utilized for navigation operations. For example, for an outdoor map covering a relatively large area, such as depicted in FIG. 4 for example, a map with relatively low level of detail but covering the relatively large area may be utilized advantageously. In another example, for an outdoor map covering a smaller area, such as depicted in FIG. 5, for example, a greater amount of detail may be included.

Similarly, for indoor areas, claimed subject matter is not limited to any particular type of map. Below, specific examples are described. However, as noted, the scope of claimed subject matter is not limited in this respect. Indoor areas represented by one or more maps may vary widely in size, or may vary widely by the type or purpose of the indoor space. For example, a main area of a shopping mall, or indoor football stadium, or airplane hanger, or other similar structure may have large to very large interiors. Another example may include a grocery store. A mobile station may store a list of grocery items specified by a user, and the mobile station may utilize one or more example navigation techniques described herein to locate the store. Additionally, a mobile station may determine routes within a grocery store to items specified by a user. Navigation techniques for determining paths through such relatively large indoor areas may differ from techniques that may be more appropriate for smaller indoor areas. For some relatively large indoor areas, navigation routing techniques may be similar to those used for outdoor areas, in an aspect. For some very small indoor areas, it may be sufficient to merely lead a user to an entrance to the indoor space, as any solution to finding a route to a final destination may be immediately apparent to the user. For example, if a user is lead to an entrance to a small 10'×10' meeting room in an office building, the user may not need to receive instructions on how to enter or cross the room. Alternatively, for relatively small rooms, a navigation solution may provide a route depicting a direct path from an entrance to a small room to a destination point. For the examples below described in connection with FIGS. 6 and 7, a couple of additional example types of navigational routing that may be appropriate for different sized indoor areas are described. Taken together, the various example techniques for determining a path from a beginning point to a destination point provide an example system for scalable routing for mobile station navigation. By selecting an appropriate map determined by a location context identifier associated with a point of interest, navigation solutions appropriate for a wide variety of situations may be made available to a user.

Figure 6:
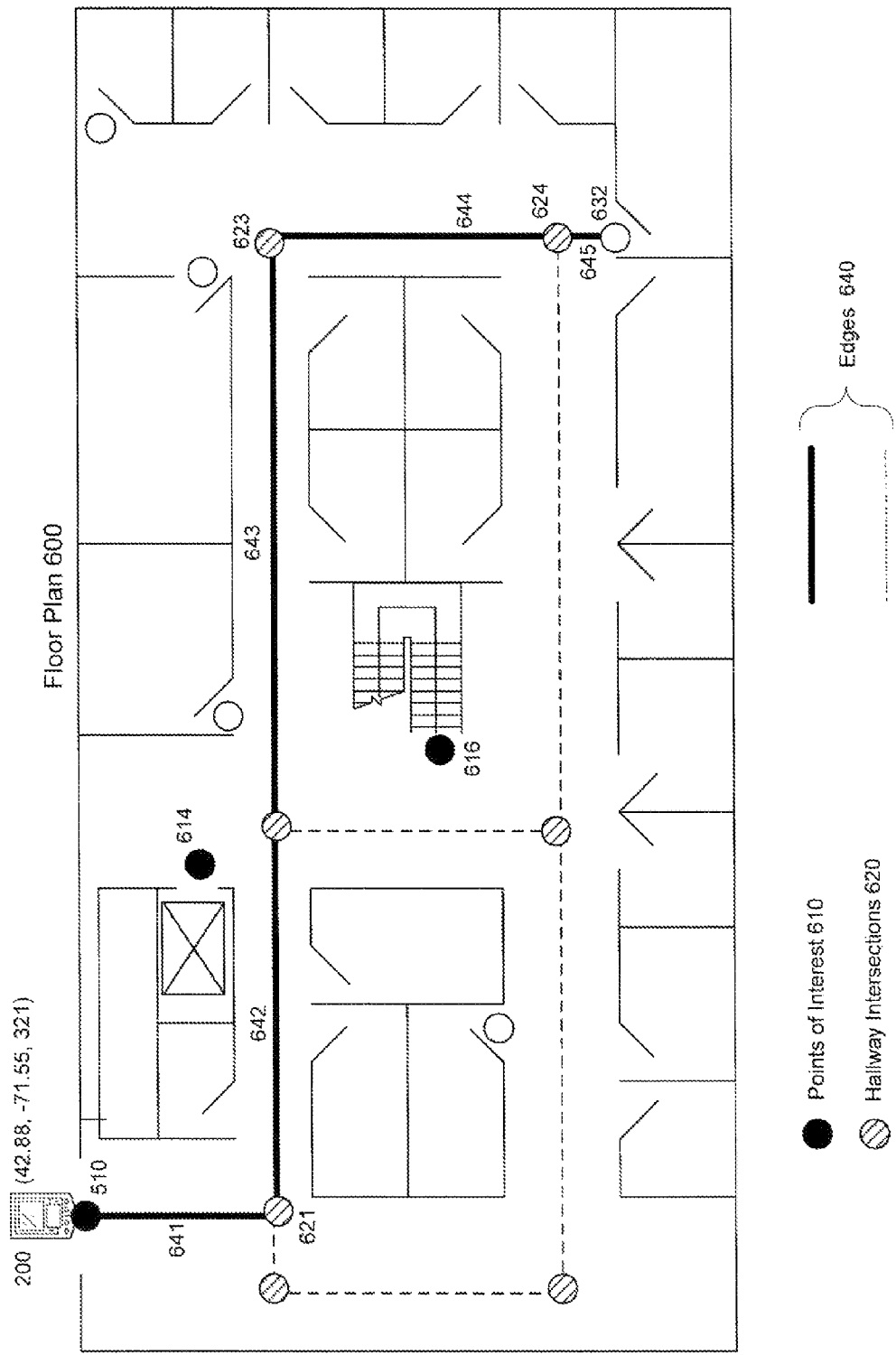
FIG. 6 is a diagram illustrating an example floor plan of an example indoor area.

FIG. 6 depicts an example floor plan 600 for a portion of example office building 500. Note that mobile station 200 is shown located at POI 510, at an entrance to office building 500. In an example, a user of mobile station 200 may provide an input to a navigation agent executed by processor 260 of mobile station 200 that specifies a destination point. In an aspect, the user may specify a particular conference room within office building 500, the entrance of which for this example is labeled destination point 632. Also in an aspect, mobile station 200 may determine an appropriate path from POI 510 to destination point 632, and mobile station 200 may present the navigation solution to the user by way of a graphical display of floor plan 600 and a display of a determined path.

In an aspect, for an example technique of intra-building routing, a floor plan such as plan 600 may be translated into a routing graph which may be used by a navigation system to determine an appropriate path to a specified destination. In an aspect, a computer aided design (CAD) representation of an indoor layout of a building, such as building 500, may be defined or marked. In an example definition of a layout, hallways and hallway intersections may be defined and marked. In a further aspect, a graphical representation of routing graph may be generated in which vertices of the routing graph represent the hallway intersections of the building. For the example of FIG. 6, hallway intersections 620 are marked. Vertices may be connected by edges if hallway intersections corresponding to the vertices are connected by a hallway. For the example of FIG. 6, edges 640 are marked. In an aspect, vertices in the routing graph may contain location information. In an example, such location information may comprise (x, y) coordinates as well as floor information. Of course, claimed subject matter is not limited in this respect. In a further aspect, edges may be assigned a weight based at least in part on a distance between intersections. Such an approach to vertex and edge creation and definition may provide a reduced complexity routing graph, which may have a number of advantages. Intended advantages may include, for example, reduced storage requirements for maps and reduced computing resources utilized in determining paths through the routing graph to destination points. In a further aspect, rooms within a building may not be represented in a routing graph in order to further reduce graph complexity. In other examples, such as that depicted in floor plan 600, entrance points of rooms may be defined. For example, floor plan 600 depicts indoor area entrance points 630. A room is merely an example of an indoor area.

Also depicted in floor plan 600 are points of interest 610. Specific points of interest 510, 614, and 616 are depicted. POI 510 is described above, and is further mentioned below. For floor plan 600, point of interest 614 is located at an entrance to an elevator, and point of interest 616 is located at a stairwell. In an example, POIs 614 and 616 may comprise location context identifiers that identify respective maps. For example, if the user of mobile station 200 walks mobile station 200 to point of interest 614, upon a determination that mobile station 200 has arrived at POI 614, map identified by an LCI associated with POI 614 may be selected by mobile station 200 for use in subsequent navigation operations. If the map identified by the LCI associated with POI 614 is not presently stored in map storage area 230 of mobile station 200, the map may be retrieved by location server 170 or another network entity, for an example. In a further aspect, the LCI associated with POI 614 may identify more than one map. For example, if the user of mobile station 200 arrives at the entrance to the elevator, it may not be known which floor of the building the user intends to visit. Therefore, it may be advantageous for mobile station 200 to have available to it maps for each of the possible floors to which the user may travel. In another example, a map switch may occur as the user exits the elevator on a particular floor as the user reaches a POI at that point in the building, and an appropriate map may be selected based on the mobile station reaching that particular floor and that particular POI. Of course, these are merely examples of how points of interest may be defined or used, and the scope of claimed subject matter is not limited in these respects.

Returning to FIG. 6, a user may specify point 632 as a destination point for a navigation operation. The user may desire to know a shortest route to destination point 632 from POI 510. As seen in FIG. 6, hallway intersections 620 are depicted, and edges 640 are shown connecting the hallway intersections. In FIG. 6, a path is shown leading from POI 510 to destination point 632. Mobile station 200 may determine a shortest path to destination point 632 at least in part by analyzing locations of hallway intersections 620 and distances between them, represented in an example by weighting values assigned to individual edges connecting the hallway intersections. For the example depicted in FIG. 6, a path is determined comprising edge 641, hallway intersection 621, edge 642, hallway intersection 622, edge 643, hallway intersection 623, edge 644, hallway intersection 624, edge 645, and ending at destination point 632. Edges not utilized as part of the solution path are shown as dashed line segments, while the edges depicted as heavy line segments comprise part of the determined solution path. Of course, the example depicted in FIG. 6 and as described above is merely an example technique for routing navigation solutions for a mobile station in an indoor area. Claimed subject matter is not limited in scope in these respects. Further, floor plan 600 is merely an example, and other indoor areas may be more complex. Example techniques described herein may be utilized to generate routing graphs and navigation solutions for large indoor spaces, such as, for example, shopping malls, office buildings, hospitals, etc.

While the example techniques described above in connection with FIG. 6 may be used advantageously for relatively large indoor areas or for intra-building navigation routing, other example techniques may be utilized for intra-room routing. The example intra-building techniques described above may be utilized with various example intra-room techniques to accomplish a two-part routing system. In an aspect, a routing process may be partitioned into two separate segments: 1) intra-building routing using routing vertices and weighted edges as described above, for example, and 2) intra-room routing. Example two-part routing techniques may reduce intra-building routing complexity. Further, rooms may often contain obstructions such as furniture or temporary walls, and these potential obstruction may be difficult to represent in the routing graph. Also, such potential obstructions may change relatively frequently, making it more difficult to keep routing graphs up-to-date. To address, at least in part, such concerns, example intra-room routing techniques may be utilized, in an aspect. In this manner, even relatively large buildings with relatively complex indoor spaces or rooms may be routed end-to-end.

An example technique for intra-room routing comprises a simple line technique, mentioned previously. A simple line-based routing technique may be used in rooms that are relatively small or in which a user's intuition may be sufficient to facilitate efficient routing. An example of such a room may comprise a simple office room or a small conference room in which there is limited furniture or obstructions. In an example implementation, determining a path from an indoor area entrance point to a destination point comprise plotting a line from the indoor area entrance point to the destination point, although claimed subject matter is not limited in scope in this respect.

Figure 7:
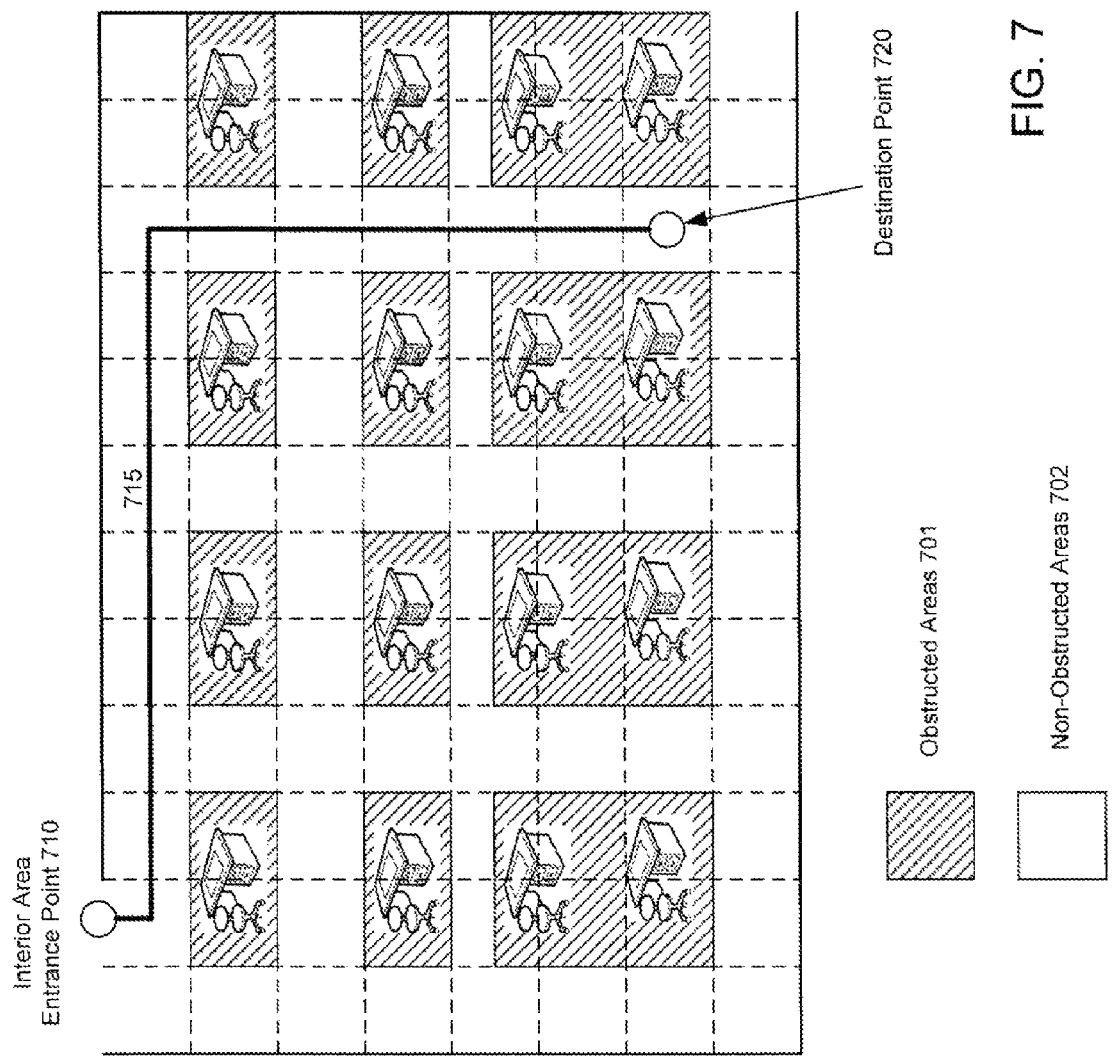
FIG. 7 is a diagram illustrating an example floor plan of an example indoor area partitioned into a grid.

FIG. 7 is an illustration depicting an example maze-based routing technique that may be utilized advantageously in rooms that may be relatively larger than the simple, smaller rooms described above. Larger rooms may contain multiple obstacles, such as cubicles, or rows of desks. A user may desire assistance to traverse such a room. As depicted in FIG. 7, a depiction of a room 700 may be partitioned into grids, or into a grid comprising a plurality of square-shaped areas. Of course, although squares are described for this example technique, claimed subject matter is not so limited. A maze map may be generated at least in part by marking any areas of the grid that contain obstacles as comprising obstructed areas 701. In an example, an obstructed area may comprise an area that may be difficult to traverse, or that may be impassable. Areas of the grid that do not have obstructions may be left blank. Such areas are labeled as non-obstructed areas 702 in FIG. 7. Once a room has been defined in this fashion, a path 715 from an indoor area entrance point 710 to a destination point 720 may be routed. Paths may be routed in this manner for even complex rooms using maze traversal-based path discovery algorithms that are well known.

Figure 8:
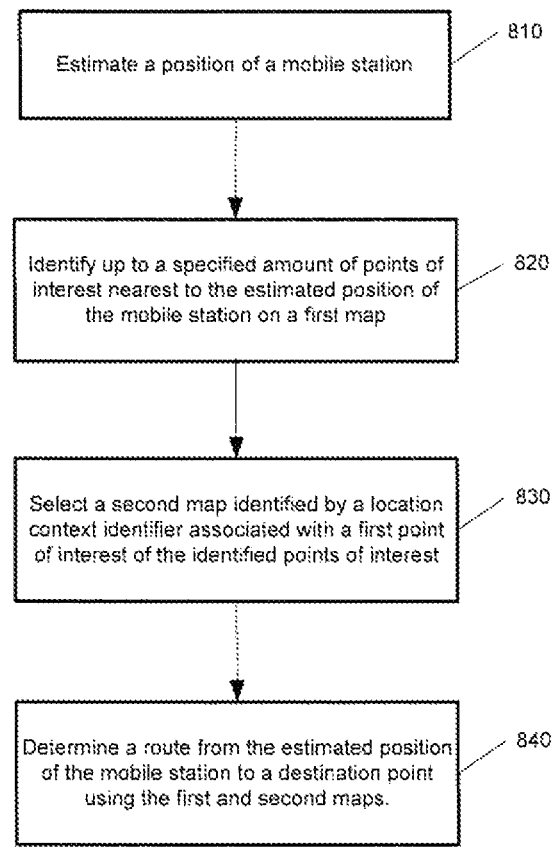
FIG. 8 is a flow diagram of an example process for scalable routing for mobile station navigation.

FIG. 8 is a flow diagram of an example technique for scalable routing for mobile station navigation. At block 810, a position of a mobile station may be estimated. At block 820, up to a specified amount of points of interest nearest the estimated position of the mobile station on a first map may be identified. At block 830, a second map may be selected. The second map may be identified by a location context identifier associated with a first point of interest of the plurality points of interest. At block 840, a route from the estimated position of the mobile station to a destination point may be determined using the first map and the second map. In an aspect, the first map may comprise a map of an outdoor area and the second map may comprise a map of an indoor area, although the scope of claimed subject matter is not limited in this respect. In a further aspect, one or more points of interest leading outdoors from the destination point may be identified.

In a further aspect, a second point of interest on the second map may be identified, and a third map identified by a second location context identifier associated with the second point of interest may be selected for use by the mobile station in a subsequent navigation operation at least in part in response to the identification of the second point of interest. Further, in an aspect, additional points of interest leading to other location context identifiers may continue to be identified, additional maps identified by the other location context identifiers may continue to be selected, and potential routes may continue to be analyzed until a final routing solution from the estimated position of the mobile station to the destination point is determined.

In a further aspect, a graphical representation of a first area may be displayed based, at least in part, on the first map, and a first plurality of points of interest individually associated with one or more location context identifiers in the first map may be displayed. In an aspect, the first plurality of points of interest may individually comprise a visual marker that may be displayed to a user. In a further aspect, the one or more location context identifiers associated with the plurality of first points of interest may individually comprise one or more pointers to a respective one or more maps. However, again, the scope of claimed subject matter is not limited in this respect. Examples in accordance with claimed subject matter may include all of, fewer than, or more than blocks 810 and 820. Further, the order of blocks 810 and 820 is merely an example order, and the scope or claimed subject matter is not limited in this respect.

Figure 9:
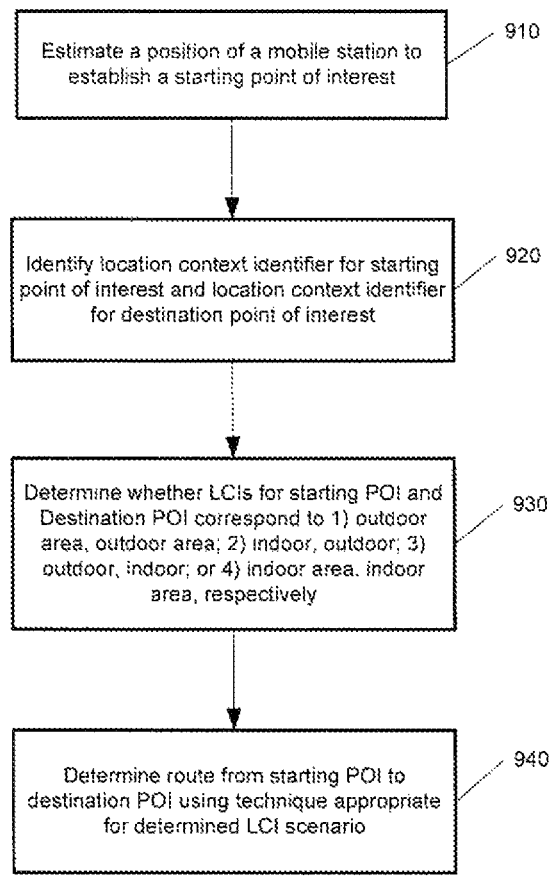
FIG. 9 is a flow diagram of an example process for scalable routing for mobile station navigation.

FIG. 9 is a flow diagram illustrating an example process for determining a route from a starting POI to a destination POI. At block 910, an estimate of a position of a mobile station may be estimated to establish a starting point of interest. At block 920, a location context identifier for the starting POI and a location context identifier for the destination POI may be identified. At block 930, a determination may be made as to which of a plurality of scenarios the LCIs for the starting POI and the destination POI correspond. In an aspect, the LCIs for the starting POI and the destination POI, respectively, may correspond to one of the following scenarios: 1) outdoor area, outdoor area; 2) indoor area, outdoor area; 3) outdoor area, indoor area; or 4) indoor area, indoor area. Additionally, at block 940, a route may be determined from the starting POI to a destination POI using a technique appropriate for the determined scenario. Of course, the process depicted in FIG. 9 is merely an example, and the scope of claimed subject matter is not limited in these respects. Further, example techniques that may be utilized in accordance with the above example scenarios are described below.

Figure 10:
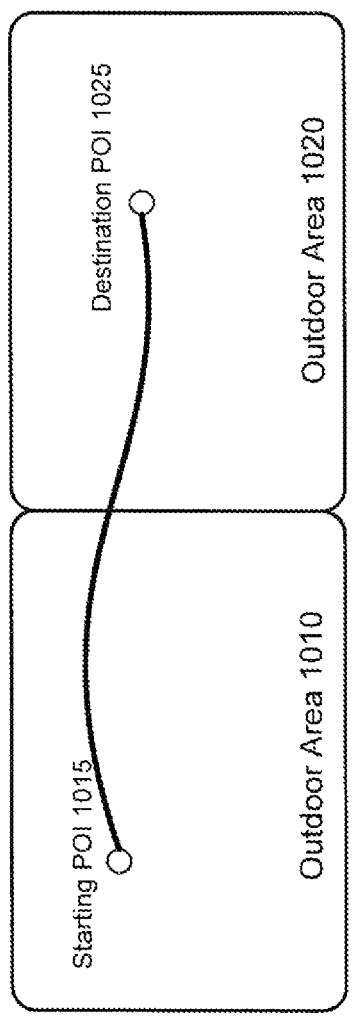
FIG. 10 is a diagram illustrating an example routing scenario including outdoor areas.

FIG. 10 is a diagram illustrating an example routing scenario including outdoor area 1010 and outdoor area 1020. The example scenario of FIG. 10 corresponds to scenario 1, mentioned above. In an aspect, for a scenario such as that depicted in FIG. 10 wherein a starting point of interest 1015 and a destination point of interest 1025 are located in outdoor areas, a route between starting POI 1015 and destination POI 1025 may be determined without regard to points of interest located at exits, as one may find in routing scenarios that may include transitions from an indoor area to an outdoor area, for example, as discussed below. In an aspect, outdoor areas 1010 and 1020 may comprise separate maps, or, in another aspect, may comprise a single map. Further, for at least some scenarios involving outdoor areas, additional intermediate outdoor areas may be located between areas 1010 and 1020. In such a case, one or more additional maps corresponding to the intermediate outdoor areas may be identified and utilized during navigation operations to determine a route. Of course, the scenario depicted in FIG. 10 is merely an example, and the scope of claimed subject matter in not limited in these respects.

Figure 11:
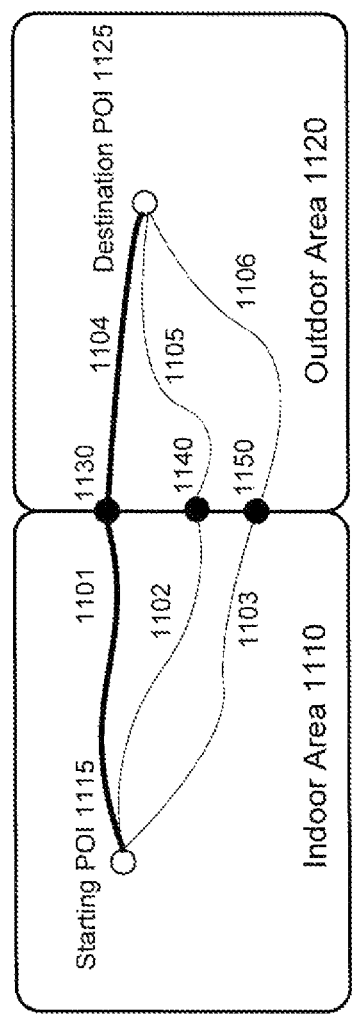
FIG. 11 is a diagram illustrating an example routing scenario including an indoor area and an outdoor area.

FIG. 11 is a diagram illustrating an example routing scenario including an indoor area 1110 and an outdoor area 1120. The example scenario depicted in FIG. 11 corresponds to example scenario 2, mentioned above. For the example depicted in FIG. 11, a starting POI 1115 may be located in indoor area 1110, and a destination POI 1125 may be located in outdoor area 1120. Also depicted in FIG. 11 are a points of interest 1130, 1140, and 1150 located at exits leading from indoor area 1110 to outdoor area 1120. POIs 1130, 1140, and 1150 may be referred to as "exit POIs". For the example scenario depicted in FIG. 11, an example routing process may determine possible routes from starting POI 1115 to exit POIs 1130, 1140, and 1150. Example possible routes 1101, 1102, and 1103 are depicted in FIG. 11. Additionally, possible routes from exit POIs 1130, 1140, and 1150 to destination POI 1125 may be determined, and are labeled as routes 1104, 1105, and 1106. In determining possible routes, a "cost value" may be determined for individual possible routes. In an aspect, a cost value may comprise a distance, a time, or some other weighting value, for example, although the scope of claimed subject matter is not limited in this respect. Cost values may provide a basis for determining, at least in part, a final route from starting POI 1115 to destination POI 1125. Final route selection may be based, at least in part, on a shortest distance from start to destination, or may be based, at least in part, on an estimated travel time from start to destination, to name merely a couple of possible examples. For the example depicted in FIG. 11, a route comprising possible routes 1101 and 1104 may comprise a shortest final route. Of course, the scenario depicted in FIG. 11 is merely, an example, and the scope of claimed subject matter is not limited in these respects.

Figure 12:
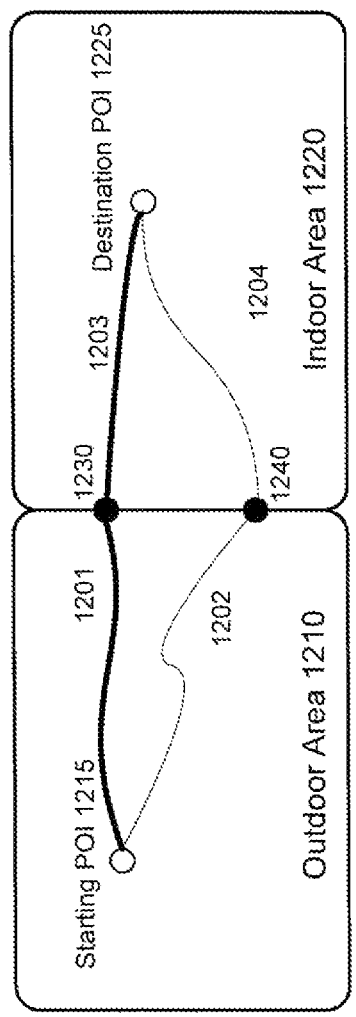
FIG. 12 is a diagram illustrating an example routing scenario including an outdoor area and an indoor area.

FIG. 12 is a diagram illustrating an example routing scenario including an outdoor area 1210 and an indoor area 1220. The example scenario depicted in FIG. 12 corresponds to example scenario 3, mentioned above. In an aspect, a starting POI 1215 may be located in outdoor area 1210, and a destination POI 1225 may be located in indoor area 1220. Exit POIs 1230 and 1240 may be located at a boundary between indoor area 1220 and outdoor area 1210, for an example. In an aspect, for the present example scenario, possible routes may be determined from destination POI 1225 to exit POIs 1230 and 1240, as depicted in FIG. 12. Possible routes from destination POI 1225 to exit POIs 1230 and 1240 are labeled 1203 and 1204, respectively. In a further aspect, possible routes from starting POI 1215 to exit POIs 1230 and 1240 may be determined, and are labeled in FIG. 12 as routes 1201 and 1202. Final route selection from starting POI 1215 to destination POI 1225 may be based, at least in part, on cost values associated with the previously determined possible routes. A final route may be determined based, at least in part, on a shortest distance from start to destination or on an estimated travel time from start to destination, to name merely a couple of possible examples. For the example depicted in FIG. 12, a route comprising possible routes 1201 and 1203 may comprise a shortest final route. Of course, the scenario depicted in FIG. 12 is merely an example, and the scope of claimed subject matter is not limited in these respects.

Figure 13:
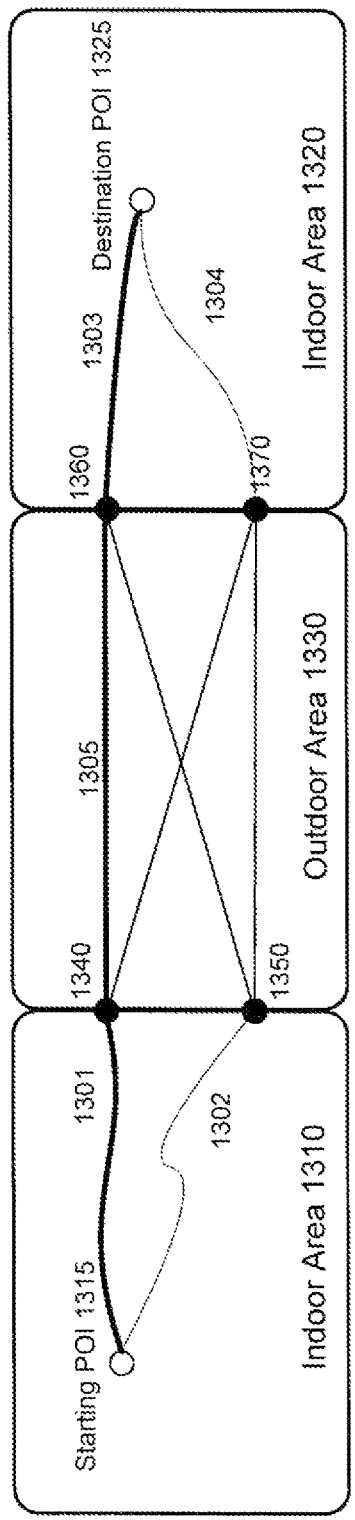
FIG. 13 is a diagram illustrating an example routing scenario including two indoor areas separated by an outdoor area.

FIG. 13 is a diagram illustrating an example routing scenario including two indoor areas separated by an outdoor area. The example scenario depicted in FIG. 13 corresponds to a special case of example scenario 4, mentioned above. In an aspect, a starting POI 1315 and a destination POI 1303 may be located in one or more indoor areas. For the example scenario of FIG. 13, starting POI 1315 may be located in indoor area 1310, and destination POI 1325 may be located in indoor area 1320. An outdoor area 1330 may be located between indoor area 1310 and indoor area 1320, in an aspect. In another aspect, to determine a route between starting POI 1315 and destination POI 1325, possible routes from starting POI 1315 to exit points for indoor area 1310, depicted as exit POIs 1340 and 1350 in FIG. 13, may be determined. Additionally, possible routes from destination POI 1325 to exit points for indoor area 1320, depicted as exit POIs 1360 and 1370 in FIG. 13, may be determined. Further, routes connecting exit POIs 1340 and 1350 to exit POIs 1360 and 1370 may be determined. A final route from starting POI 1315 to destination POI 1325 may be determined at least in part by determining a lowest cost path, for example. For the example depicted in FIG. 13, a route comprising possible routes 1301, 1305, and 1303 may comprise a shortest final route. Of course, the scenario depicted in FIG. 13 is merely an example, and the scope of claimed subject matter is not limited in these respects.

In a further aspect, for an example routing process such as that described above in connection with FIG. 13, wherein the starting point and the destination point are each located in an indoor area, a possibility exists that the starting point and the destination point may be located in the same indoor area. As described above, for an example routing scenario having both starting and destination POIs located in indoor areas, an example routing process may comprise determining possible paths from the starting POI to the exits of the starting POI indoor area, and may also comprise determining possible paths from the destination POI to the exits of the destination POI indoor area. In determining possible routes from the destination POI to the exits for the destination POI indoor area, possible routes may be determined that pass through one or more points of interest having an LCI that matches an LCI of point of interest located along routes previously determined from the starting POI to exits of the starting POI indoor area. Upon discovering such a match of LCIs, it may be determined that the starting POI and the destination POI are located in the same indoor area. Note that an indoor area may comprise one or more floors, and that determining possible routes from a starting or destination POI to exit POIs may comprise analyzing possible paths through one or more intermediate points of interest that may denote indoor features. Indoor features on a map that may be represented on or in the map as points of interest may include, for example, staircases, elevators, escalators, moving sidewalks, interior doorways, etc. Of course, these are merely examples, and the scope of claimed subject matter is not limited in this respect.

Figure 14:
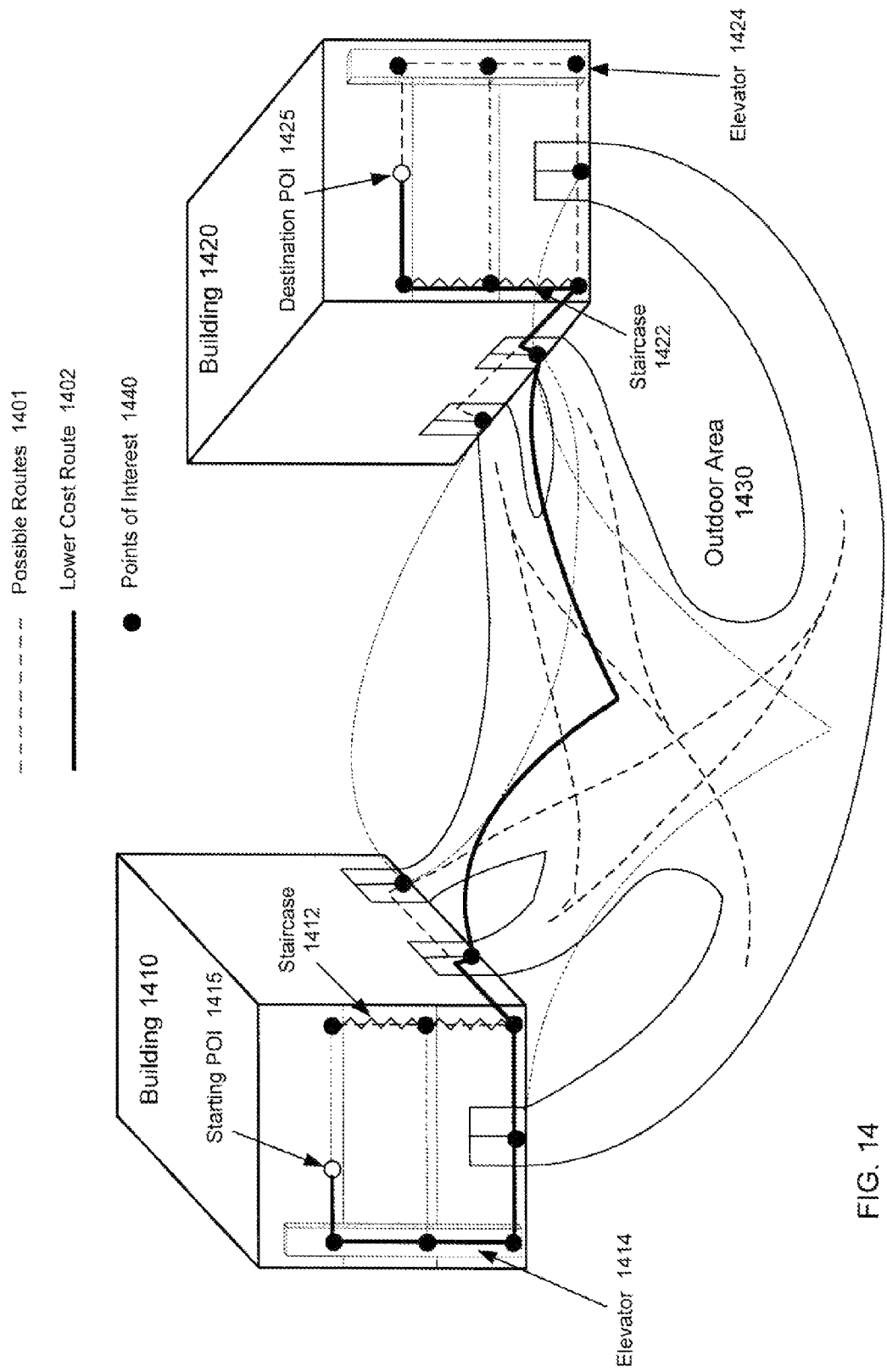
FIG. 14 is a diagram illustrating an example routed path from a starting point of interest in a building to a destination point of interest in another building through an outdoor area.

FIG. 14 is a diagram illustrating an example lowest cost route 1402 from a starting point of interest 1415 in a building 1410 to a destination point of interest 1425 in a building 1420 through an outdoor area 1430. Points of interest 1440 are also depicted in FIG. 14, including exit points of interest for buildings 1410 and 1420. In an aspect, an example routing process that may be utilized to determine a best path may correspond to the example process described above in connection with FIG. 13. As with the example scenario of FIG. 13, the example of FIG. 14 includes a starting POI and a destination POI located in indoor areas, which corresponds to example scenario 4, mentioned above. In an aspect, an example routing process may comprise determining possible routes from starting POI 1415 to exit POIs for building 1410. Note that example building 1410 comprises an elevator 1414 and a staircase 1412, and that possible paths may utilize those indoor features. Indoor features may have cost values that may be utilized in determining routes. Of course, other example buildings may include other types of indoor features such as, for example, escalators, moving sidewalks, interior doorways, etc. In a further aspect, possible routes may be determined from destination POI 1425 to exit POIs for building 1420. Building 1420 comprises a staircase 1422 and an elevator 1424, although again, other example buildings may include other types of indoor features. Further, although buildings 1410 and 1420 comprise three floors, the scope of claimed subject matter is not limited in this respect.

In a further aspect, possible routes may be determined from the exit POIs at building 1410 to the exit POIs at building 1420. Possible routes may be individually associated with a cost value, as described above. For a situation where each building comprises three exit POIs, nine possible routes may be determined. These possible paths between building 1410 and building 1420 may be analyzed along with previously determined possible routes from starting POI 1415 to the exit POIs for building 1410 and along with previously determined possible routes from destination POI 1425 to the exit POIs for building 1420 to determine lowest cost route 1402.

As with other examples described previously, the routing example depicted in FIG. 14 may be depicted as a graph structure. As with previously described examples, a routing solution may utilize one or more graphs. For the example of FIG. 14, each floor of buildings 1410 and 1420 may be depicted as a graph structure such as that shown in FIG. 6 or 7, for example. As with the example of FIG. 6, each floor of buildings 1410 and 1420 may be represented by a graph structure comprising hallway intersections and edges connecting hallway intersections or points of interest. As mentioned above, edges may have weighting values. Weighting values may be used, at least in part, to determine cost values for possible routes. Similarly, outdoor paths between exits points for buildings 1410 and 1420 may be represented as a graph structure, for example. However, the graph structure described in connection with FIG. 14 is merely an example routing technique, and the scope of claimed subject matter is not limited in these respects.

Methodologies described herein may be implemented by various means depending upon applications according to particular examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by a processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Wireless communication techniques described herein may be in connection with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple. Access (SC-FDMA) network, or any combination of the above networks, and so on. A CDMA network may implement one or more radio access technologies (RATS) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Wireless communication implementations described herein may also be used in connection with any combination of WWAN, WLAN and/or WPAN. Further, wireless communications described herein may comprise wireless communications performed in compliance with a 4G wireless communication protocol.

The term "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

The invention claimed is:

1. A method in a device, the method comprising:
   estimating a first position of a mobile station on a first map, wherein the first map is associated with a first location context identifier;
   identifying, by the device, one or more transition areas nearest to the position of the mobile station, on the first map associated with a first location context identifier;
   identifying, by the device, a second location context identifier associated with at least a first transition area of the one or more transition areas, wherein the second location context identifier is associated with a second map; and
   obtaining the second map.

2. The method of claim 1, wherein the first map comprises a map of an outdoor area, and wherein the second map comprises a map of an indoor area, and further comprising identifying a transition area leading outdoors.

3. The method of claim 1, further comprising:
   identifying a second transition area of the one or more transition areas on the second map;
   identifying, by the device, a third location context identifier associated with at least the second transition area, wherein the third location context identifier is associated with a third map; and
   obtaining the third map.

4. The method of claim 1, and further comprising displaying:
   a graphical representation of a first area based at least in part on the first map; and
   a first plurality of transition areas from the one or more transition areas.

5. The method of claim 4, wherein the first plurality of transition areas further individually comprise a visual marker.

6. The method of claim 4, wherein the first plurality of transition areas comprises one or more pointers to a respective one or more maps.

7. The method of claim 2, wherein said second map comprises a routing graph of the indoor area.

8. The method of claim 7, wherein the routing graph comprises:
   a plurality of vertices individually representing one of a plurality of hallway intersections;
   one or more indoor area entrance points; and
   a plurality of edges, comprising one or more edges to individually connect two or more of the plurality of hallway intersections and further comprising one or more edges to individually connect one of the plurality of hallway intersections and one of the one or more indoor area entrance points.

9. The method of claim 8, further comprising:
   assigning one or more first weight values to a respective one or more of the plurality of edges according to a distance between two or more of the plurality of hallway intersections; and
   assigning one or more second weight values to another respective one or more of the plurality of edges according to a distance between a first indoor area entrance point of the one or more indoor area entrance points and a hallway intersection of the plurality of hallway intersections.

10. The method of claim 9, further comprising determining a path from the first transition area to a destination point.

11. The method of claim 10, wherein determining the path comprises:
   determining a first path from the first transition area to the first indoor area entrance point; and
   determining a second path from the first indoor area entrance point to the destination point.

12. The method of claim 11, wherein determining the first path comprises determining a shortest route from the first transition area to the first indoor area entrance point based at least in part on locations of one or more of the plurality of hallway intersections, and further based at least in part on the one or more first weight values of the respective one or more of the plurality of edges connecting the two or more of the plurality of hallway intersections.

13. The method of claim 11, wherein determining the second path from the first indoor area entrance point to the destination point comprises plotting a line from the first indoor area entrance point to the destination point.

14. The method of claim 11, wherein determining the second path from the first indoor area entrance point to the destination point comprises:
   generating a grid of the indoor area comprising partitioning the indoor area into a plurality of areas;
   identifying one or more areas of the plurality of areas that do not contain obstructions; and
   determining a shortest path through the one or more areas identified as not containing obstructions from the first indoor area entrance point to the destination point.

15. The method of claim 11, wherein said first indoor area entrance point comprises a location context identifier identifying the map of the indoor area, and wherein determining the second path from the first indoor area entrance point to the destination point comprises determining the second path using the map of the indoor area.

16. An article, comprising: a non-transitory storage medium having stored thereon instructions executable by a processor of a mobile station to:
   estimate a first position of the mobile station on a first map, wherein the first map is associated with a first location context identifier;
   identify, by a device, one or more transition nearest to the position of the mobile station, on a first map associated with a first location context identifier;
   identify, by the device, a second location context identifier associated with at least a first transition area of the one or more transition areas, wherein the second location context identifier is associated with a second map; and
   obtaining the second map.

17. The article of claim 16, wherein the first map comprises a map of an outdoor area, and wherein the second map comprises a map of an indoor area, and wherein the non-transitory storage medium has stored thereon further instructions executable by the processor to identify a transition area leading outdoors.

18. The article of claim 16, wherein the non-transitory storage medium has stored thereon further instructions executable by the processor to:
   identify a second transition area of the one or more transition areas on the second map; and
   identifying, by the device, a third location context identifier associated with at least the second transition area, wherein the third location context identifier is associated with a third map; and
   obtaining the third map.

19. The article of claim 16, wherein the non-transitory storage medium has stored thereon further instructions executable by the processor to:
   display a graphical representation of a first area based at least in part on the first map; and
   display a first plurality of transition areas from the one or more transition areas.

20. The article of claim 19, wherein the first plurality of transition areas further individually comprise a visual marker.

21. The article of claim 19, wherein the first plurality of transition areas comprises one or more pointers to a respective one or more maps.

22. The article of claim 17, wherein said second map comprises a routing graph of the indoor area.

23. The article of claim 22, wherein the routing graph comprises:
   a plurality of vertices individually representing one of a plurality of hallway intersections;
   one or more indoor area entrance points; and
   a plurality of edges, comprising one or more edges to individually connect two or more of the plurality of hallway intersections and further comprising one or more edges to individually connect one of the plurality of hallway intersections and one of the one or more indoor area entrance points.

24. The article of claim 23, wherein the non-transitory storage medium has stored thereon further instructions executable by the processor to:
   assign one or more first weight values to a respective one or more of the plurality of edges according to a distance between two or more of the plurality of hallway intersections; and
   assign one or more second weight values to another respective one or more of the plurality of edges according to a distance between a first indoor area entrance point of the one or more indoor area entrance points and a hallway intersection of the plurality of hallway intersections.

25. The article of claim 24, wherein the non-transitory storage medium has stored thereon further instructions executable by the processor to determine a path from the first transition area to a destination point.

26. The article of claim 25, wherein the non-transitory storage medium has stored thereon further instructions executable by the processor to determine the path at least in part by:
   determining a first path from the first transition area to the first indoor area entrance point; and
   determining a second path from the first indoor area entrance point to the destination point.

27. The article of claim 26, wherein the non-transitory storage medium has stored thereon further instructions executable by the processor to determine the first path at least in part by determining a shortest route from the first transition area to the first indoor area entrance point based at least in part on locations of one or more of the plurality of hallway intersections, and further based at least in part on the one or more first weight values of the respective one or more of the plurality of edges connecting the two or more of the plurality of hallway intersections.

28. The article of claim 26, wherein the non-transitory storage medium has stored thereon further instructions executable by the processor to determine the second path from the first indoor area entrance point to the destination point at least in part by plotting a line from the first indoor area entrance point to the destination point.

29. The article of claim 26, wherein the non-transitory storage medium has stored thereon further instructions executable by the processor to determine the second path from the first indoor area entrance point to the destination point at least in part by:

generating a grid of the indoor area comprising partitioning the indoor area into a plurality of areas;

identifying one or more areas of the plurality of areas that do not contain obstructions; and determining a shortest path through the one or more areas identified as not containing obstructions from the first indoor area entrance point to the destination point.

30. The article of claim 26, wherein said first indoor area entrance point comprises a location context identifier identifying the map of the indoor area, and wherein the non-transitory storage medium has stored thereon further instructions executable by the processor to determine the second path from the first indoor area entrance point to the destination point at least in part by determining the second path using the map of the indoor area.

31. A mobile station, comprising:
a memory to store a plurality of maps for navigation operations; and
a processor to
estimate a first position of the mobile station on a first map,
wherein the first map is associated with a first location context identifier;
identify, by a device, one or more transition areas nearest to the position of the mobile station on a first map associated with a first location context identifier;
identify, by the device, a second location context identifier associated with at least a first transition area of the one or more transition areas, wherein the second location context identifier is associated with a second map; and
obtaining the second map.

32. The mobile station of claim 31, wherein the first map comprises a map of an outdoor area, and wherein the second map comprises a map of an indoor area, the further the processor to identify a transition area leading outdoors.

33. The mobile station of claim 31, the processor further to:
identify a second transition area of the one or more transition areas on the second map;
identify, by the device, a third location context identifier associated with at least the second transition area, wherein the third location context identifier is associated with a third map; and
obtain the third map.

34. The mobile station of claim 31, further comprising a display screen to display:
a graphical representation of a first area based at least in part on the first map; and
a first plurality of transition areas from the one or more transition areas.

35. The mobile station of claim 34, wherein the first plurality of transition areas further individually comprise a visual marker.

36. The mobile station of claim 34, wherein the first plurality of transition areas comprises one or more pointers to a respective one or more maps.

37. The mobile station of claim 32, wherein said second map comprises a routing graph of the indoor area.

38. The mobile station of claim 37, wherein the routing graph comprises:
a plurality of vertices individually representing one of a plurality of hallway intersections;
one or more indoor area entrance points; and
a plurality of edges, comprising one or more edges to individually connect two or more of the plurality of hallway intersections and further comprising one or more edges to individually connect one of the plurality of hallway intersections and one of the one or more indoor area entrance points.

39. The mobile station of claim 38, the processor further to:
assign one or more first weight values to a respective one or more of the plurality of edges according to a distance between two or more of the plurality of hallway intersections; and
assign one or more second weight values to another respective one or more of the plurality of edges according to a distance between a first indoor area entrance point of the one or more indoor area entrance points and a hallway intersection of the plurality of hallway intersections.

40. The mobile station of claim 39, the processor further to determine a path from the first transition area to a destination point.

41. The mobile station of claim 40, the processor further to determine the path at least in part by:
determining a first path from the first transition area to the first indoor area entrance point; and
determining a second path from the first indoor area entrance point to the destination point.

42. The mobile station of claim 41, the processor further to determine the first path by determining a shortest route from the first transition area to the first indoor area entrance point based at least in part on locations of one or more of the plurality of hallway intersections, and further based at least in part on the one or more first weight values of the respective one or more of the plurality of edges connecting the two or more of the plurality of hallway intersections.

43. The mobile station of claim 41, the processor further to determine the second path from the first indoor area entrance point to the destination point at least in part by plotting a line from the first indoor area entrance point to the destination point.

44. The mobile station of claim 41, the processor further to determine the second path from the first indoor area entrance point to the destination point at least in part by:
generating a grid of the indoor area comprising partitioning the indoor area into a plurality of areas;
identifying one or more areas of the plurality of areas that do not contain obstructions; and
determining a shortest path through the one or more areas identified as not containing obstructions from the first indoor area entrance point to the destination point.

45. The mobile station of claim 41, wherein said first indoor area entrance point comprises a location context identifier identifying the map of the indoor area, the processor further to determine the second path from the first indoor area entrance point to the destination point at least in part by determining the second path using the map of the indoor area.

46. An apparatus, comprising:
means for estimating a first position of a mobile station on a first map, wherein the first map is associated with a first location context identifier;
means for identifying one or more transition areas nearest to the position of the mobile station, on the first map associated with a first location context identifier;
means for identifying, by the device, a second location context identifier associated with at least a first transition area of the one or more transition areas, wherein the second location context identifier is associated with a second map; and
means for obtaining the second map.

47. The apparatus of claim 46, wherein the first map comprises a map of an outdoor area, and wherein the second map comprises a map of an indoor area, and further comprising means for identifying a transition area leading outdoors.

48. The apparatus of claim 46, further comprising:
 means for identifying a second transition area of the one or more transition areas on the second map; and
 means for identifying, by the device, a third location context identifier associated with at least the second transition area, wherein the third location context identifier is associated with a third map; and
 means for obtaining the third map.

49. The apparatus of claim 46, further comprising means for displaying:
 a graphical representation of a first area based at least in part on the first map; and
 a first plurality of transition areas from the one or more transition areas.

50. The apparatus of claim 49, wherein the first plurality of transition areas further individually comprise a visual marker.

51. The apparatus of claim 49, wherein the first plurality of transition areas comprises one or more pointers to a respective one or more maps.

52. The apparatus of claim 47, wherein said second map comprises a routing graph of the indoor area.

53. The apparatus of claim 52, wherein the routing graph comprises:
 a plurality of vertices individually representing one of a plurality of hallway intersections;
 one or more indoor area entrance points; and
 a plurality of edges, comprising one or more edges to individually connect two or more of the plurality of hallway intersections and further comprising one or more edges to individually connect one of the plurality of hallway intersections and one of the one or more indoor area entrance points.

54. The apparatus of claim 53, further comprising:
 means for assigning one or more first weight values to a respective one or more of the plurality of edges according to a distance between two or more of the plurality of hallway intersections; and
 means for assigning one or more second weight values to another respective one or more of the plurality of edges according to a distance between a first indoor area entrance point of the one or more indoor area entrance points and a hallway intersection.

55. The apparatus of claim 54, further comprising means for determining a path from the first transition area to a destination point.

56. The apparatus of claim 55, wherein said means for determining the path comprises:
 means for determining a first path from the first transition area to the first indoor area entrance point; and
 means for determining a second path from the first indoor area entrance point to the destination point.

57. The apparatus of claim 56, wherein said means for determining the first path comprises means for determining a shortest route from the first transition area to the first indoor area entrance point based at least in part on locations of one or more of the plurality of hallway intersections, and further based at least in part on the one or more first weight values of the respective one or more of the plurality of edges connecting the two or more of the plurality of hallway intersections.

58. The apparatus of claim 56, wherein said means for determining the second path from the first indoor area entrance point to the destination point comprises means for plotting a line from the first indoor area entrance point to the destination point.

59. The apparatus of claim 56, wherein said means for determining the second path from the first indoor area entrance point to the destination point comprises:
 means for generating a grid of the indoor area comprising partitioning the indoor area into a plurality of areas;
 means for identifying one or more areas of the plurality of areas that do not contain obstructions; and
 means for determining a shortest path through the one or more areas identified as not containing obstructions from the first indoor area entrance point to the destination point.

60. The apparatus of claim 56, wherein said first indoor area entrance point comprises a location context identifier identifying the map of the indoor area, and wherein said means for determining the second path from the first indoor area entrance point to the destination point comprises means for determining the second path using the map of the indoor area.

61. The method of claim 1, wherein each of the one or more transition comprises one of:
 a staircase;
 an elevator;
 an escalator;
 a moving walkway;
 an external door;
 an internal door separating two indoor portions of a building; or
 an internal door separating a connection between buildings.

62. The method of claim 1, wherein each of the one or more transition areas comprises a transition point on the first map that identifies a transition point to the second map.

63. The method of claim 1, wherein the first map and the second map both identify indoor areas.

64. The method of claim 1, wherein the first map comprises a map of an outdoor area, and wherein the second map comprises a map of an indoor area, and further comprising:
 identifying a transition area leading outdoors;
 identifying a second transition area of the one or more transition areas on the second map;
 identifying, by the device, a third location context identifier associated with at least the second transition area, wherein the third location context identifier is associated with a third map; and
 obtaining the third map.

65. The method of claim 1, wherein identifying, by the device, the one or more transition areas comprises identifying, by the device, the one or more transition areas up to a specified number of transition areas.

66. The method of claim 1, further comprising sending the second location context identifier to a server.

67. The method of claim 1, further comprising estimating a second position of a mobile station on the second map.

68. The method of claim 1, further comprising receiving, at the device, a destination point.

69. The method of claim 1, further comprising determining a route from the position to a destination point that includes the first transition area, using the first map and the second map.

70. The method of claim 3, further comprising determining a route from the position to a destination point that includes the first transition area and the second transition area, using the first map, the second map and the third map.

* * * * *